Figure 1:
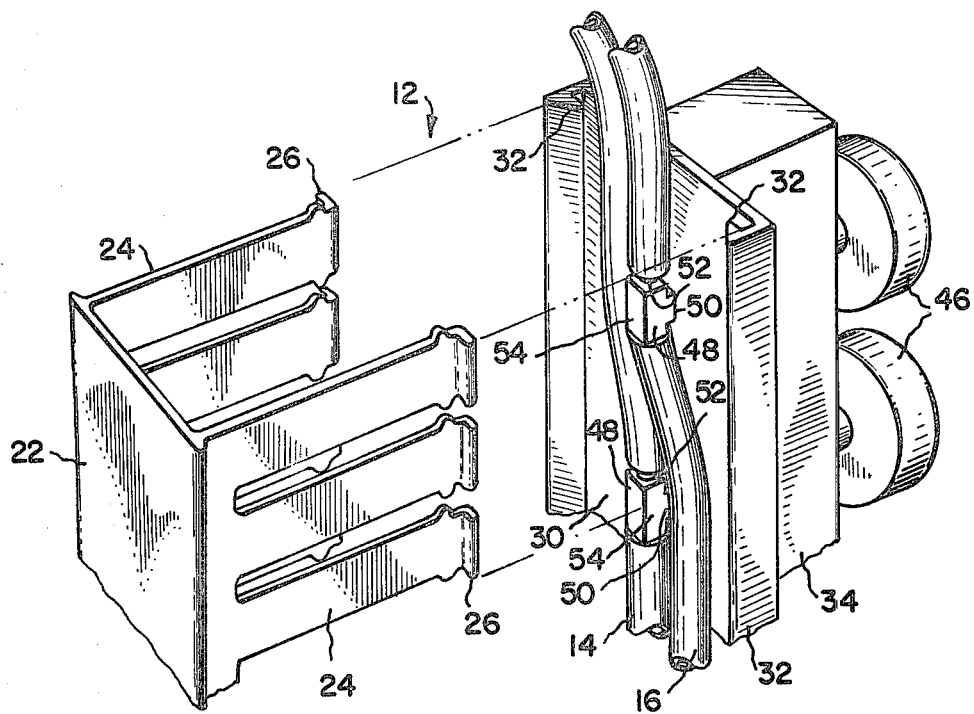

United States Patent [19]

Day

[11] 4,182,367
[45] Jan. 8, 1980

[54] PNEUMATIC TERMINAL AND GAUGE ASSEMBLY

[75] Inventor: James L. Day, Fairport, N.Y.

[73] Assignee: James L. Day Co. Inc., Rochester, N.Y.

[21] Appl. No.: 898,752

[22] Filed: Apr. 21, 1978

Related U.S. Application Data

[63] Continuation-in-part of Ser. No. 845,697, Oct. 26, 1977, abandoned.

[51] Int. Cl.² ............................................. G01L 19/14
[52] U.S. Cl. ..................................... 137/557; 73/756; 137/594; 137/884; 251/368
[58] Field of Search ............ 116/266; 73/168, 40.5 R, 73/756; 137/557, 594, 884; 251/368

[56] References Cited

U.S. PATENT DOCUMENTS

| | | | |
|---|---|---|---|
| 3,028,877 | 4/1962 | Thieme | 137/557 |
| 3,438,260 | 4/1969 | Kowal et al. | 73/756 |
| 3,485,937 | 12/1969 | Caveney | 174/101 |
| 3,603,154 | 9/1971 | Frantz | 73/756 |
| 3,678,752 | 7/1972 | Dellert | 73/756 |
| 3,698,432 | 10/1972 | Kutz | 137/884 |
| 3,765,441 | 10/1973 | Chang | 137/884 |
| 3,960,019 | 6/1976 | Jakobsen | 73/40.5 R |
| 4,092,865 | 6/1978 | Strybel | 73/756 |
| 4,136,450 | 1/1979 | Güenther et al. | 137/884 |

Primary Examiner—William R. Cline
Assistant Examiner—H. Jay Spiegel
Attorney, Agent, or Firm—Martin LuKacher

[57] ABSTRACT

A terminal and gauge assembly which provides connections for lines to or from individual fluid pressure circuits, such as the pneumatic circuits of a pneumatically operated control system includes a duct with a removable cover. The lines run longitudinally inside the duct. A bar located on the cover outside of the duct is formed with spaced chambers. The lines are terminated at couplings which extend into the chambers and serve to fasten the bar to the cover of the duct. Gauges or test points are mounted on the bar and connect to the chambers so that the pressure or other parameter associated with each circuit may be monitored.

10 Claims, 2 Drawing Figures

PNEUMATIC TERMINAL AND GAUGE ASSEMBLY

This application is a continuation-in-part of U.S. patent application Ser. No. 845,697 filed Oct. 26, 1977, now abandoned, for Pneumatic Terminal and Gauge Block.

The present invention relates to fluid pressure apparatus and particularly to a terminal assembly which is adapted to be used in providing connections to pressurized fluid lines while at the same time enabling the pressure or other parameter associated with the circuits connected to such lines to be monitored.

This invention is especially suitable for use in control systems for heating, ventilating and air conditioning equipment. In such systems control signals are carried by pressurized air lines. In the above referenced U.S. patent application there is shown a terminal block which is adapted to provide connections for such lines and to enable the monitoring of pressure or other parameter associated with each circuit. The terminal block is in the form of a bar which is attached to the panel. Couplings extend from the sides of the bar into individual chambers. Gauges extend from the front of the bar into the chambers.

The present invention provides means whereby the lines may be connected to the bar in a manner more convenient and suitable for many applications. In accordance with the present invention the bar is mounted on the cover of a duct, which cover is removable from the duct, as by being received interlocking relationship with side flanges which extend from the base of the duct. The bar has spaced chambers which may be formed by holes extending through the bar between the front and rear faces thereof. Holes in the cover are aligned with the holes in the bar. Couplings, as may be "T" couplings, extend through the holes in the cover and into the holes in the bar to provide connections to the chambers. These couplings preferably, also serve to secure the bar to the cover. Gauges or test points may extend into the chambers from the front face of the bar, while the lines are connected to the couplings. The lines run longitudinally along the duct and may be assembled in bundles so as to be brought out of the ends of the duct for connection to sensors, controlled devices or to the devices of the control system. The base of the duct may be assembled on the same panel as the control system devices. The connection of the lines to the terminal block may readily be accomplished simply by removing the cover from the duct. The assembly and maintenance of the control system equipment is thus greatly facilitated.

Accordingly, it is an object of the present invention to provide an improved terminal block assembly for pressurized fluid lines which facilitates the installation and use of pressurized fluid apparatus such as control systems for heating, ventilating and air conditioning units, and the like.

It is a further object of the present invention to provide an improved terminal and gauge assembly wherein access to the terminal is provided from the rear of the terminal and which enables terminated lines to be bundled or harnessed for ease of assembly and maintenance.

Figure 2:
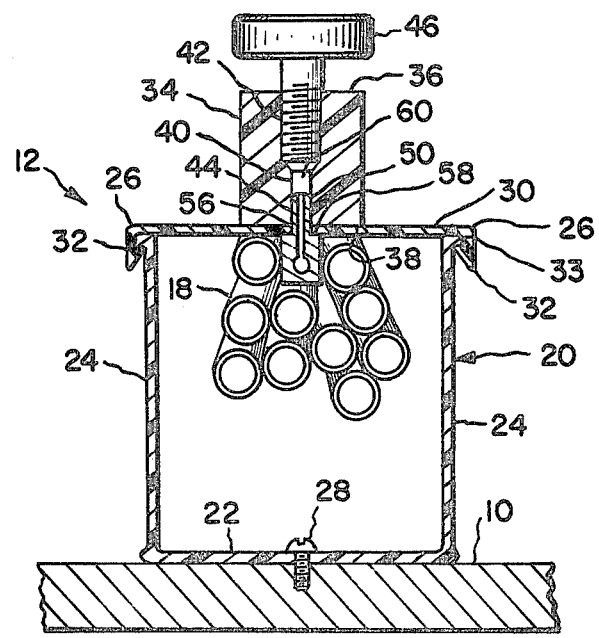

The foregoing and other features, objects and advantages of the invention, as well as the presently preferred embodiment thereof will become more apparent from a reading of the following description in connection with the accompanying drawings in which:

FIG. 1 is a perspective, exploded view of a portion of a pneumatic terminal and gauge assembly in accordance with the invention; and FIG. 2 is a sectional view through the terminal and gauge assembly shown in FIG. 1 which illustrates the installation of the assembly, together with a bundle of lines which are connected thereto, on a panel.

Referring to the drawings, there is shown a panel 10, a terminal and gauge assembly 12, mounted on a panel 10. The panel 10 may have also mounted thereon the various units of a fluid pressure system such as a heating, ventilating and air conditioning control system. The need for conveniently connecting the fluid pressure lines to the devices of such a control system was discussed in the above referenced patent application. The present invention makes connections to these devices especially convenient to accomplish and enables the lines which carry such signals to be arranged in a bundle and held in a harness which simplifies the installation and maintenance of such control systems. As noted in the above referenced patent application, the term "panel" should be taken to connote a board on which the control system is mounted and also the bottom or any wall of a cabinet or box containing the control system.

The terminal and gauge block assembly 12 provides terminations for several pneumatic lines, two of which 14 and 16 are shown in FIG. 1. A bundle 18 of these pneumatic lines is shown in FIG. 2. This bundle may be held in a harness and the entire bundle with its harness may be prefabricated prior to installation of the assembly.

The assembly includes a duct 20 having a base 22 and flexible side flanges 24 which may be in the form of fingers. The base 22 is fastened to the panel 10 as by screws 28. The upper end of each finger is formed with a lip 26. The duct 20 has a separate cover plate 30. Side flanges 32 on the cover also have lips which form grooves 33 such that the lips 26 of the flexible side flanges 24 enter the grooves 33 and interlock with the cover 30. The side flanges 24 may be elongated, say 2" to 3" in length. The duct 20 may be of any desired length. For example, it may be as long as the panel 10. The duct 20 is readily assembled and disassembled by flexing the side flanges 24 inwardly, and removing the cover 30. A suitable duct is available from the Panduit Corporation and may be of the type described in U.S. Pat. No. 3,485,937 issued Dec. 23, 1969.

A block or bar 34 of fluid impervious material, suitably a plastic such as nylon is included in the assembly 12. The bar 34 has front and rear faces 36 and 38. The rear face 38 is mounted on the cover 30 in juxtaposition with the outside thereof and suitably centrally of the cover. The bar 34 extends longitudinally along the duct 20. A plurality of holes 40 are provided in the bar 34. These holes are spaced from each other longitudinally of the bar and are preferably disposed along the center line of the bar.

Each hole has a region 42 of larger diameter which is suitably threaded and is adjacent to the front face 36. Each hole has another region 44 of smaller diameter adjacent the rear face 38. Pressure gauges 46, test points or other means for closing the holes 40 are provided. Pressure gauges are preferred since they enable the pressure in each circuit which is terminated at the assembly 12 to be monitored.

The smaller diameter regions 44 of each hole 40 are closed by separate couplings 48. These couplings are "T" couplings having three arms 50, 52 and 54. Longitudinally spaced holes 56 are provided in the cover. These holes are spaced so as to be aligned with the holes 40 in the bar 34. The arms 50 of each of the couplings 48 extends through the holes 56 in the cover 30 and into the smaller diameter region 44 of each hole 40 where they are received with a force fit. The coupling arms may be tapered to fit easily and tightly in the holes 40 and inside the lines 14, 16 and 18. The center section of each coupling is formed with a step 58 which is butted against the inside of the cover 30 and serves to hold the bar 34 on the outside of the cover without the need for any additional fasteners.

The lines 14 and 16 are attached to the other arms 52 and 54 of each coupling. These arms 52 and 54 are preferably disposed with their axes extending longitudinally and in the same direction as the bar 34 and the duct 20. The lines 14 and 16 therefore run essentially in the longitudinal direction and may be flexed or bent slightly so as to clear these couplings 48 to which they are not attached.

Each line is associated with a separate circuit. Each hole has a separate chamber 60 defined by the walls of the hole, the coupling 48 and the end of the gauge 46 which may be screwed into the large diameter region 42 of that hole. The pressure in each chamber 60 and therefore in each circuit is separately monitored by different ones of the gauges 46. An identification legend strip mounted on the bar 34 or the cover 30 may be used to carry indicia identifying the circuits associated with each individual chamber 60 and their specified operating pressure. The operator or maintenance personnel may then readily determine whether or not the circuit is operating as specified.

With the cover 30 removed, the lines in the bundle 18 may readily be hooked up to the terminals; simply by inserting the lines into the couplings 48. The cover 30 may then be replaced. A large number of lines may be located in the assembly on the inside of the duct and brought out of the duct to the devices of the control system or to external units such as sensors, transducers, pumps, relays and the like.

From the foregoing description it will be apparent that there has been provided still further improvements in pneumatic terminal and gauge block assemblies which provide ready access to pressurized fluid connections and a means for monitoring the circuits associated with these connections. Variations and modifications in the herein described pneumatic terminal and gauge block assembly will undoubtedly suggest themselves to those skilled in the art. Accordingly, the foregoing description should be taken merely as illustrative and not in any limiting sense.

What is claimed is:

1. A terminal assembly for a plurality of pressurized fluid lines which is adapted to be attached to a panel, said terminal assembly comprising (a) a duct having a base arranged for attachment to said panel, flexible side flanges extending from said base in a direction away from said panel, and a cover plate having flanges which are receivable in interlocking relationship with said side flanges to define a passage running longitudinally of said duct through which said lines extend, (b) an elongated bar of material which is impervious to said fluid disposed on said cover plate outside of said duct, said bar extending longitudinally along said cover plate, said bar having a front face and rear face, said rear face being in juxtaposition with the outside of said cover plate, (c) a plurality of separate holes in said bar spaced from each other longitudinally along said bar, said holes extending through said bar from said front face to said rear face, a plurality of couplings each for different ones of said lines, said couplings having a plurality of arms, holes in said cover spaced from each other correspondingly with said holes in said bar, each of said couplings being disposed inside said duct with a first of said arms thereof extending through different ones of said cover holes into different ones of said bar holes and disposed in fluid tight engagement with said bar within said bar holes, different ones of said lines being in fluid tight engagement with others of said plurality of arms, and (d) means for separately closing said bar holes at said front face of said bar, said closing means and said couplings defining separate chambers spaced longitudinally along said bar said closing means including, for at least some of said bar holes, means for measuring and displaying a characteristic of the pressurized fluid.

2. The invention as set forth in claim 1 wherein said means for closing said bar holes at the front face of said bar are separate gauges responsive to the pressure of the fluid in said chambers.

3. The invention as set forth in claim 1 wherein said coupling each have a section from which said arms extend, said section and said first arm defining a step, said step engaging the inside of said cover plate to attach said bar to said cover plate.

4. The invention as set forth in claim 3 wherein said first arm has a force fit with said bar hole and said step is butted against said cover plate at the inside thereof.

5. The invention as set forth in claim 4 wherein said couplings are "T" couplings, having three arms, said first arm being one of said three arms, and said other arms being the second and third arms of said "T" coupling, said lines being attached to said second and third arms.

6. The invention as set forth in claim 1 wherein said fluid is pressurized air.

7. The invention as set forth in claim 1 wherein said bar holes have regions of a first diameter and a second diameter, said second diameter being smaller than said first diameter, said first diameter regions being adjacent to said front face and said second diameter regions being adjacent to said rear face.

8. The invention as set forth in claim 1 wherein said first diameter regions of said holes are internally threaded for receiving said closing means and said second diameter regions have smooth walls for receiving said first arms of said couplings with a force fit.

9. The invention as set forth in claim 1 wherein said bar consists of plastic material.

10. The invention as set forth in claim 9 wherein said plastic material is nylon.

* * * * *